United States Patent
Dobashi (10) Patent No.: US 10,598,891 B2
(45) Date of Patent: Mar. 24, 2020

(54) CONTROL APPARATUS, IMAGE CAPTURING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Toshiyuki Dobashi, San Jose, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/141,659

(22) Filed: Sep. 25, 2018

(65) Prior Publication Data
US 2019/0094489 A1    Mar. 28, 2019

(30) Foreign Application Priority Data
Sep. 27, 2017    (JP) ................. 2017-186519

(51) Int. Cl.
| | |
|---|---|
| G02B 7/28 | (2006.01) |
| G03B 17/55 | (2006.01) |
| H04N 5/225 | (2006.01) |
| G03B 13/36 | (2006.01) |
| G02B 7/09 | (2006.01) |
| G02B 7/02 | (2006.01) |
| H04N 5/232 | (2006.01) |
| H04N 5/217 | (2011.01) |

(52) U.S. Cl.
CPC ............. *G02B 7/28* (2013.01); *G02B 7/028* (2013.01); *G02B 7/09* (2013.01); *G03B 13/36* (2013.01); *G03B 17/55* (2013.01); *H04N 5/217* (2013.01); *H04N 5/2254* (2013.01); *H04N 5/22521* (2018.08); *H04N 5/23209* (2013.01); *H04N 5/23212* (2013.01); *H04N 5/23296* (2013.01)

(58) Field of Classification Search
CPC . G02B 7/28; G02B 7/028; G02B 7/09; H04N 5/217; H04N 5/23209; H04N 5/23296; H04N 5/23212; H04N 5/2254; H04N 5/22521; G03B 13/36; G03B 17/55
See application file for complete search history.

(56) References Cited

U.S. PATENT DOCUMENTS

| | | | |
|---|---|---|---|
| 6,826,361 B1 * | 11/2004 | Yost ................. | G03B 13/36 396/97 |
| 2001/0050758 A1 | 12/2001 | Suzuki et al. | |
| 2013/0003025 A1 | 1/2013 | Cheng et al. | |

(Continued)

FOREIGN PATENT DOCUMENTS

| | | |
|---|---|---|
| JP | H08292359 A | 11/1996 |
| JP | H10-051673 A | 2/1998 |

OTHER PUBLICATIONS

Extended European Search Report issued by the European Patent Office dated Feb. 20, 2019 in corresponding European Patent Application No. 18196538.5.

*Primary Examiner* — Timothy J Henn
(74) *Attorney, Agent, or Firm* — Carter, DeLuca & Farrell LLP (57) ABSTRACT

A control apparatus (13) includes a data acquirer (13*a*) that acquires correction data indicating a relationship between a temperature change amount and a focus movement amount and a focus controller (13*b*) that changes an operation mode of a temperature changer depending on the correction data.

14 Claims, 6 Drawing Sheets

(56) References Cited

U.S. PATENT DOCUMENTS

| | | | |
|---|---|---|---|
| 2017/0343765 A1* | 11/2017 | Maruyama | G02B 7/028 |
| 2017/0366740 A1* | 12/2017 | Nakamaru | H04N 5/23212 |
| 2018/0284390 A1* | 10/2018 | Chino | G03B 3/10 |
| 2019/0187403 A1* | 6/2019 | Wada | G02B 7/028 |

* cited by examiner

CONTROL APPARATUS, IMAGE CAPTURING APPARATUS, CONTROL METHOD, AND NON-TRANSITORY COMPUTER-READABLE STORAGE MEDIUM

BACKGROUND OF THE INVENTION

Field of the Invention

The present invention relates to an image capturing apparatus that performs focus control.

Description of the Related Art

Conventionally, a technology of correcting a change of a focus position due to expansion or contraction according to a temperature change of a member of an image capturing optical system or an image capturing apparatus is known. Japanese Patent Laid-open No. H8-292359 discloses a method of correcting the focus position by controlling the drive of a focus lens and a magnification-varying lens according to a difference between a detected temperature and a reference temperature. Further, an image capturing apparatus provided with a cooling fan for radiating the heat generated by the process of the image capturing apparatus to change the temperature inside the image capturing apparatus is known.

According to Japanese Patent Laid-open No. H8-292359, it is possible to correct the focus position in consideration of the temperature change. However, in the image capturing apparatus disclosed in Japanese Patent Laid-open No. H8-292359, the situation in which the cooling fan for radiating heat is mounted on the image capturing apparatus is not taken into account, and therefore in the image capturing apparatus having the cooling fan, the correction of the focus position cannot be performed satisfactorily in some cases.

For example, when the cooling fan of the image capturing apparatus is rotating, the temperature detected by the image capturing apparatus may deviate from an actual temperature of the image capturing optical system that greatly affects the deviation of the focus position. In such a case, if the focus position is simply corrected based on the temperature detected by the image capturing apparatus, the focus position may be deviated instead.

SUMMARY OF THE INVENTION

The present invention provides a control apparatus, an image capturing apparatus, a control method, and a non-transitory computer-readable storage medium which are capable of satisfactorily correcting a deviation of a focus position caused by a temperature change even when the image capturing apparatus has a device for changing the temperature.

A control apparatus as one aspect of the present invention includes a data acquirer configured to acquire correction data indicating a relationship between a temperature change amount and a focus movement amount, and a focus controller configured to change an operation mode of a temperature changer depending on the correction data.

An image capturing apparatus as another aspect of the present invention includes an image sensor configured to photoelectrically convert an optical image formed via an image capturing optical system, a memory configured to store correction data indicating a relationship between a temperature change amount and a focus movement amount, a data acquirer configured to acquire the correction data from the memory, a temperature changer configured to change a temperature, and a focus controller configured to change an operation mode of the temperature changer depending on the correction data.

A control method as another aspect of the present invention includes the steps of acquiring correction data indicating a temperature change amount and a focus movement amount, and changing an operation mode of a temperature changer depending on the correction data.

A non-transitory computer-readable storage medium as another aspect of the present invention stores a program which causes a computer to execute the control method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First Embodiment

Figure 1:
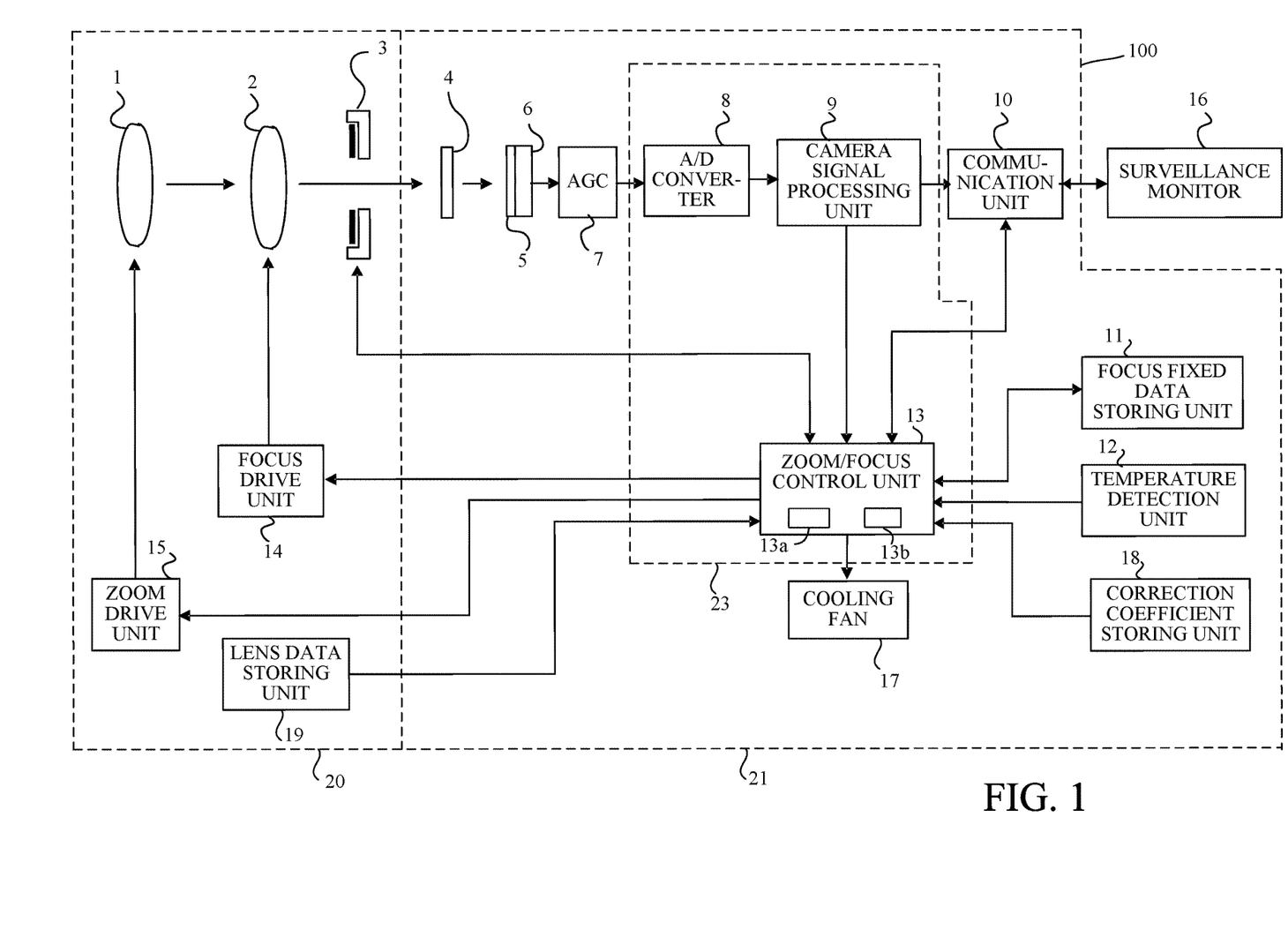
FIG. 1 is a block diagram of an image capturing apparatus in each embodiment.

First, referring to FIG. 1, the internal configuration of an image capturing apparatus in a first embodiment of the present invention will be described. FIG. 1 is a block diagram of an image capturing apparatus 100. In this embodiment, particularly, a focus control method of correcting a focus deviation (focus shift) due to a temperature change will be described.

An image capturing optical system includes a zoom lens (magnification-varying lens) 1 that moves in an optical axis direction to change a focal length, a focus lens 2 that moves in the optical axis direction to perform focusing, and an aperture unit 3 that adjusts a light amount. Light passing through the image capturing optical system forms an object image as an optical image on an image sensor 6 via a band pass filter 4 and a color filter 5. The image sensor 6 includes a CMOS sensor or a CCD sensor, and it photoelectrically converts the object image formed via the image capturing optical system. An AGC 7 performs gain adjustment on an analog electric signal (image capturing signal) output from the image sensor 6. An A/D converter 8 converts the gain-adjusted analog electric signal into a digital signal. A camera signal processing unit 9 performs various image processing on the digital signal (digital image capturing signal) to generate an image signal. The image signal is output to a surveillance monitor 16 connected to the image capturing apparatus 100 via a communication unit 10 by wired or wireless communication, and it is output to a zoom/focus control unit 13 of the image capturing apparatus 100.

A focus fixed data storing unit 11 stores mode information indicating an on/off state of a focus position fixed mode, which is a mode of fixing a focus position corresponding to a focused object distance, and a mode selected in the focus position fixed mode. The mode information is written in the focus fixed data storing unit 11 via the communication unit 10 and the zoom/focus control unit 13 by communication from the surveillance monitor 16 operated by a user (observer). The mode information automatically transits to a fixed mode at the completion of a manual focus (MF) or autofocus (AF) process caused by the operation of the user.

The zoom/focus control unit 13 performs focus control (AF control) using a contrast evaluation value indicating a contrast state of the image signal calculated based on the image signal, temperature focus correction control described below, control of the cooling fan 17, and the like. The zoom/focus control unit 13 controls a focus drive unit 14 to drive the focus lens 2 in an optical axis direction. Further, the zoom/focus control unit 13 controls a zoom drive unit 15 to drive the zoom lens 1 in the optical axis direction.

A temperature detection unit (temperature detector) 12 detects the temperature of the image capturing apparatus 100. The zoom/focus control unit 13 acquires temperature (temperature information) via the temperature detection unit 12 at predetermined time intervals to monitor a change in temperature. As the temperature detecting section 12, a temperature sensor such as a thermistor is used. The cooling fan (temperature changer) 17 circulates the air inside and outside the image capturing apparatus 100 to cool the image capturing apparatus 100. An operation mode of the cooling fan 17 can be selected from a total of five modes of four constant speed modes of a high speed mode, a medium speed mode, a low speed mode, and a stop mode, and an automatic mode in which these constant speed modes are automatically switched according to the temperature detected by the temperature detection unit 12. The default is set to the automatic mode.

A correction coefficient storing unit (memory) 18 holds (stores) a correction coefficient (correction data) that is used for a temperature focus correction process described below. Preferably, the correction coefficient is stored for each type or each zoom position of the lens barrel 20 (image capturing optical system). A lens data storing unit 19 stores lens identification information such as a lens ID, a lens name, and a serial number, and position information of the focus lens 2 and the zoom lens 1.

The zoom/focus control unit 13 includes a data acquirer 13a and a focus controller 13b. The data acquirer 13a acquires the correction coefficient (correction data) indicating the relationship between a temperature change amount and a focus movement amount. The focus controller 13b changes the operation mode of the cooling fan 17 according to the correction coefficient. Then, the focus controller 13b performs focus control based on the temperature detected by the temperature detection unit 12. Preferably, the focus controller 13b performs the focus control based on the temperature change amount detected by the temperature detection unit 12 and the correction coefficient.

Figure 2:
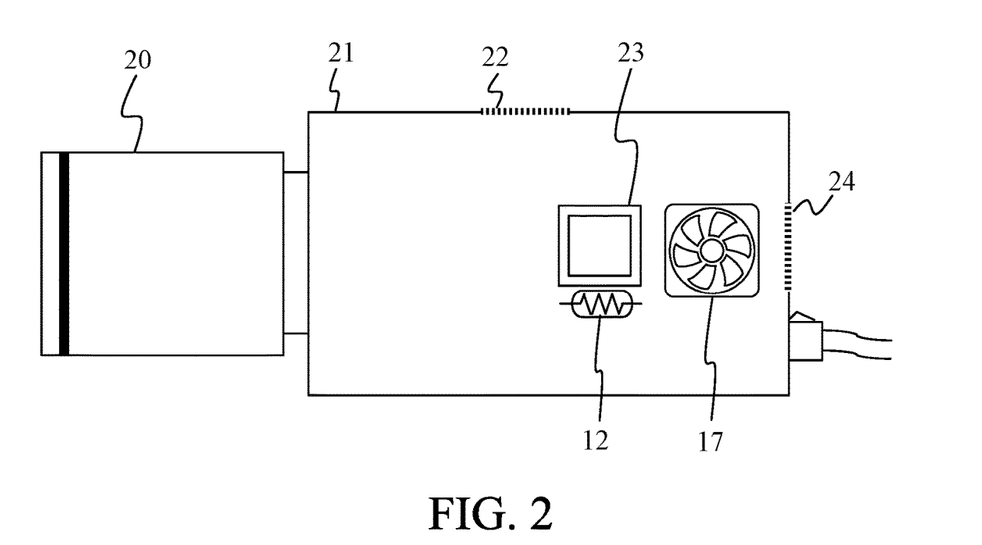
FIG. 2 is a configuration diagram of the image capturing apparatus in each embodiment.

Next, referring to FIG. 2, the structural configuration of the image capturing apparatus 100 will be described. FIG. 2 is a configuration diagram of the image capturing apparatus 100. The image capturing apparatus 100 includes an image capturing apparatus body 21 and a lens barrel (interchangeable lens) 20 detachable from the image capturing apparatus body 21. However, this embodiment is not limited thereto, and can also be applied to an image capturing apparatus in which the image capturing apparatus body and the lens barrel are integrally formed.

The lens barrel 20 includes the zoom lens 1, the focus lens 2, the aperture unit 3, the focus drive unit 14, the zoom drive unit 15, and the lens data storing unit 19, and it is interchangeable according to application. The image capturing apparatus body 21 includes elements in FIG. 1 other than the lens barrel 20 and the surveillance monitor 16. A processor 23 is a processing unit (CPU) including the A/D converter 8, the camera signal processing unit 9, and the zoom/focus control unit 13. The cooling fan 17 is provided mainly for cooling the processor 23, and it is disposed near the processor 23 together with the temperature detection unit 12. When the cooling fan 17 is operated, outside air is sucked from an air inlet 22, passes around the processor 23, and is exhausted from an air outlet 24.

Figure 3:
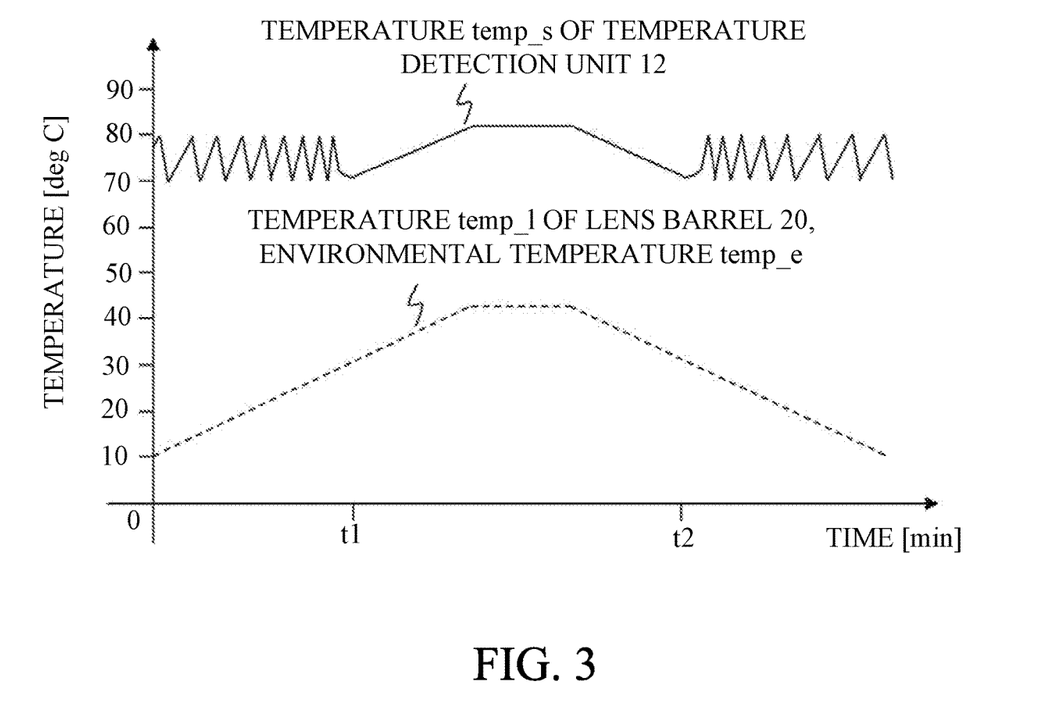
FIG. 3 is a graph illustrating a temperature when an operation mode of a cooling fan is an automatic mode in each embodiment.

Next, referring to FIG. 3, the principle of the correction process (temperature focus correction process) in this embodiment will be described. FIG. 3 is a graph illustrating the temperature (temperature temp_s detected by the temperature detection unit 12, temperature temp_l of the lens barrel 20, environmental temperature temp_e) when the operation mode of the cooling fan 17 of the image capturing apparatus 100 is in the automatic mode. In FIG. 3, the horizontal axis represents time and the vertical axis represents temperature. In this embodiment, the environmental temperature is the temperature of the environment in which the image capturing apparatus 100 is installed, that is, the external temperature.

First, the temperature focus correction will be described. When a temperature change occurs in the lens barrel 20, expansion and contraction occur in the lens barrel 20, resulting in defocusing. Then, the zoom/focus control unit 13 acquirers the temperature from the temperature detection unit 12 to drive the focus lens 2 by a drive amount according to the temperature change amount, and thus it can correct a focus deviation due to the temperature change of the lens barrel 20. The correction process of the focus deviation according to this temperature change amount is referred to as a temperature focus correction process. The temperature focus correction process is based on the premise that there is a correlation between the temperature temp_s detected by the temperature detection unit 12 and the temperature temp_l of the lens barrel 20.

However, when the image capturing apparatus 100 is cooled by the cooling fan 17, as illustrated in FIG. 3, the correlation between the temperature temp_s and the temperature temp_l is lost, and accordingly an appropriate correction process cannot be performed. When the cooling fan 17 is set to the automatic mode, the zoom/focus control unit 13 automatically switches a rotation speed of the cooling fan 17 according to the temperature temp_s. In this embodiment, threshold values (threshold temperatures) that are used for switching the rotation speed of the cooling fan 17 are f_th1 to f_th4, and they are set to f_th1=70 deg C., f_th2=80 deg C., f_th3=85 deg C., and f_th4=90 deg C.

The rotation speed of the cooling fan 17 is in the stop state as an initial state. When the temperature temp_s exceeds the threshold value f_th2, the zoom/focus control unit 13 switches the rotation speed of the cooling fan 17 to low speed rotation for cooling. When the temperature temp_s decreases due to the rotation of the cooling fan 17 and the temperature temp_s becomes less than the threshold value f_th1, the zoom/focus control unit 13 stops the rotation of the cooling fan 17. When the temperature temp_s exceeds the threshold value f_th3, the zoom/focus control unit 13 switches the cooling fan 17 to medium speed rotation and maintains the rotation speed until the temperature temp_s becomes less than the threshold value f_th1. When the temperature temp_s is less than the threshold value f_th1, the zoom/focus control unit 13 stops the rotation of the cooling fan 17. Similarly, the zoom/focus control unit 13 switches the cooling fan 17 to high speed rotation when the temperature temp_s exceeds the threshold value f_th4, and it stops the rotation of the cooling fan 17 when the temperature temp_s is less than the threshold value f_th1.

In FIG. 3, when the temperature temp_s exceeds the threshold value f_th2 (80 deg C.) during time 0 to t1, the cooling fan 17 switches from the stop to the low speed rotation to perform cooling. When the temperature temp_s falls below the threshold f_th1 (70 deg C.) due to cooling, the cooling fan 17 stops. When the cooling fan 17 stops, the temperature temp_s exceeds the threshold f_th2 again, and the cooling fan 17 is switched to the low speed rotation. In this way, since the cooling fan 17 repeats the stop and the low speed rotation, the graph of the temperature temp_s has a saw shape.

During time t1 to t2, the temperature temp_s does not become lower than the threshold value f_th1 as the environmental temperature temp_e rises, and the cooling fan 17 maintains the low speed rotation. As a result, the graph of the temperature temp_s does not have a saw shape, but has a high correlation shape in which the temperature temp_s substantially coincides with the temperature temp_1 of the lens barrel 20. In FIG. 3, it is assumed that the environmental temperature temp_e and the temperature temp_1 of the lens barrel 20 are substantially the same.

As described above, the correlation between the temperature temp_s and the temperature temp_1 is greatly affected by the operation mode (rotation mode) of the cooling fan 17. That is, although the automatic mode has advantages of silence or the like, it is unsuitable for the temperature focus correction. This is particularly noticeable when the temperature detection unit 12 is installed at a position away from the lens barrel, for example, in an image capturing apparatus provided with an interchangeable lens or the like. Therefore, in this embodiment, an appropriate temperature focus correction process is performed by controlling the operation mode of the cooling fan 17 according to the temperature focus correction amount of the lens barrel 20.

Figure 4:
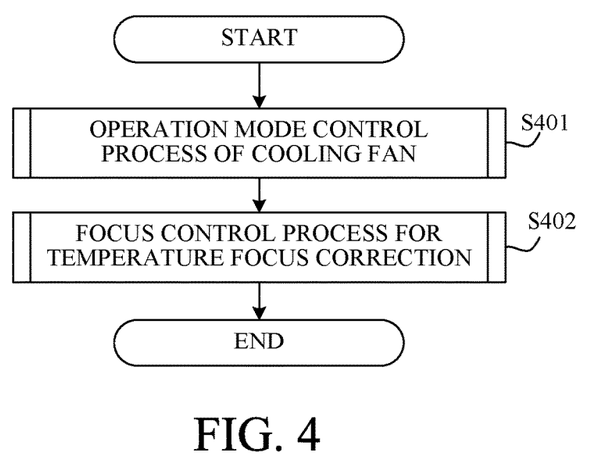
FIG. 4 is a flowchart illustrating a temperature focus correction process in a first embodiment.

Next, referring to FIG. 4, the temperature focus correction process (focus control method) of this embodiment will be described. FIG. 4 is a flowchart illustrating the temperature focus correction process (focus control method). Each step of FIG. 4 is performed by the zoom/focus control unit 13. That is, the zoom/focus control unit 13, which is a computer, periodically executes the temperature focus correction process in accordance with a focus program as a computer program. This flow is roughly divided into two steps of steps S401 to S402. Step S401 is a process (operation mode control process of the cooling fan 17) of controlling the operation mode of the cooling fan 17 according to a temperature focus correction amount of the lens barrel 20. Step S402 is a process of performing the focus control for the temperature focus correction. Each step will be described in detail below.

Figure 5:
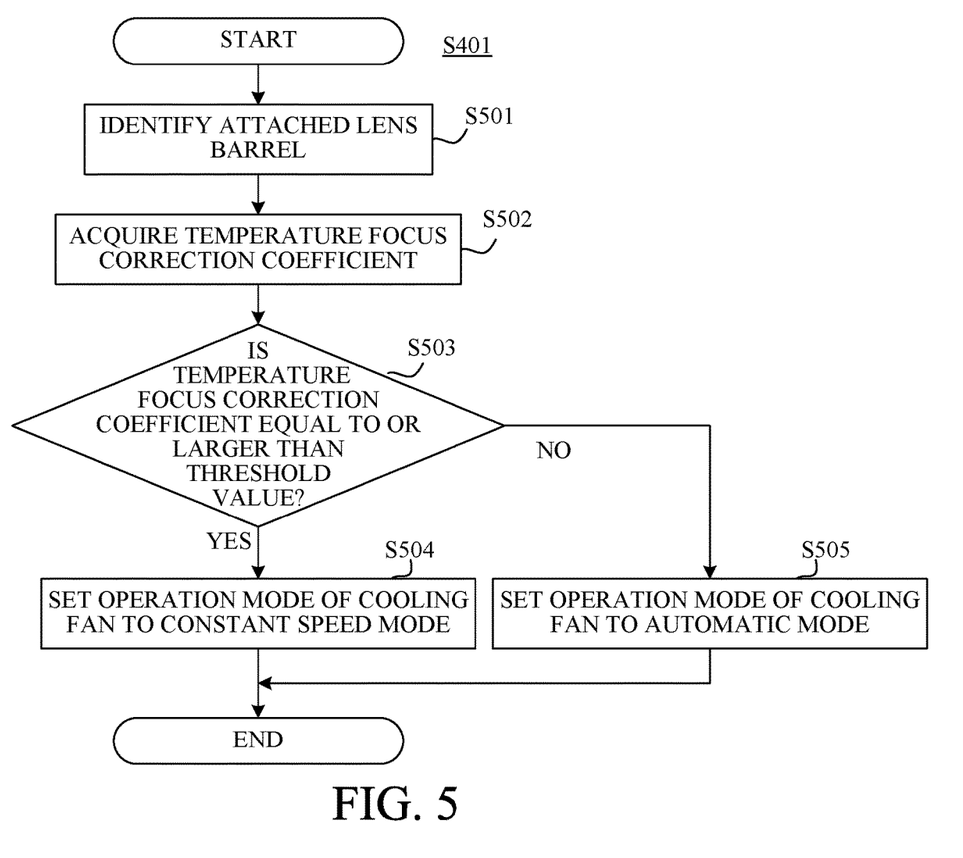
FIG. 5 is a flowchart illustrating an operation mode control process of the cooling fan in the first embodiment.

Referring to FIG. 5, step S401 will be described in detail. FIG. 5 is a flowchart illustrating an operation mode control process of the cooling fan 17. First, at step S501, the zoom/focus control unit 13 acquires lens information from the lens data storing unit 19, and it identifies the attached lens, that is, the lens barrel 20 attached to the image capturing apparatus 100. Identification of the lens barrel 20 is performed based on the lens information such as a lens ID, a lens name, a serial number, or the like.

Subsequently, at step S502, the zoom/focus control unit 13 acquires a correction coefficient (temperature focus correction coefficient) coef from the correction coefficient storing unit 18 based on the lens identification result at step S501. The correction coefficient coef is a focus movement amount (a movement amount of the focus lens 2, that is, a change amount of the focus position) per unit temperature change amount measured in advance. This embodiment assumes that the correction coefficient coef is previously measured by the following procedure. Since the magnitude (sensitivity) of the focus deviation per moving amount of the focus lens 2 varies according to the type of the lens barrel 20, this measurement is performed for each type of the lens barrel 20. By this measurement, the correction coefficient coef is obtained for each type of the lens barrel 20. The correction coefficient coef may be stored in advance in the correction coefficient storing unit 18, or the lens data storing unit 19 may transmit the corresponding correction coefficient coef to the zoom/focus control unit 13.

Hereinafter, a method of calculating the correction coefficient coef will be described. First, the environmental temperature temp_e is set to temp_low, and the focus lens 2 is adjusted to the best focus position by AF or MF under the environment at the environmental temperature temp_low. The focus position at this time is stored as fpos_low. Next, the environmental temperature temp_e is increased up to temp_high, and the focus lens 2 is similarly adjusted to the best focus position under the environment. The focus position at this time is stored as fpos_high. In this period, it is assumed that the image capturing apparatus 100 and the object are located at the same positions, respectively. Finally, the correction coefficient (correction data) coef is calculated by expression (1) below.

$$\text{coef} = (\textit{fpos\_high} - \textit{fpos\_low}) / (\text{temp\_high} - \text{temp\_low}) \quad (1)$$

Each of the environmental temperatures temp_low and temp_high is determined based on the operation guarantee temperature of the image capturing apparatus 100 and the like. For example, if the operation guarantee temperature is −5 deg C. to 50 deg C., temp_low=−5 deg C. and temp_high=50 deg C. are satisfied.

In the case of the zoom lens, since the focus deviation differs for each zoom position, it is preferred that the correction coefficient coef is calculated for each zoom position. For example, as the zoom position is close to the telephoto side, the focus deviation increases and accordingly the correction coefficient coef also increases. Therefore, in the case of the zoom lens, the zoom/focus control unit 13 acquires the correction coefficient coef corresponding to the zoom position at step S502.

Subsequently, at step S503, the zoom/focus control unit 13 determines whether the correction coefficient coef acquired at step S502 is equal to or larger than a threshold value coef_th. When the correction coefficient coef is equal to or larger than the threshold value coef_th, the flow proceeds to step S504. On the other hand, when the correction coefficient coef is less than the threshold value coef_th, the flow proceeds to step S505. In this embodiment, it is assumed that the temperature of the lens barrel 20 changes from the lower limit to the upper limit of the operation guarantee temperature of the image capturing apparatus 100, and it is determined whether the focus deviation at that time falls within a depth of field. That is, the threshold value coef_th is a value obtained by dividing the focus drive amount of the depth of field by a width of the operation guarantee temperature.

Subsequently, at step S504, the zoom/focus control unit 13 sets the operation mode of the cooling fan 17 to the constant speed mode, and the process is ended. In this embodiment, the zoom/focus control unit 13 sets the low speed mode as the constant speed mode. The operation mode to be set in the constant speed mode can be changed according to an assumed use environment of the image capturing apparatus 100. For example, when it is used in a high temperature environment, the high speed mode is set as the constant speed mode. When the operation mode in the constant speed mode is set in advance by the user, the operation mode intended by the user may be set as the constant speed mode.

At step S505, the zoom/focus control unit 13 sets the operation mode of the cooling fan 17 to the automatic mode, and the process is ended. When it is determined at step S503 that the correction coefficient coef is less than the threshold value coef_th, the temperature focus correction process at step S402 may be skipped (omitted).

In this way, in this embodiment, the operation mode includes the constant speed mode in which the cooling fan 17 is rotated at a constant speed and the automatic mode in which the rotation speed of the cooling fan 17 is variable. When the correction coefficient (correction data) is larger than a predetermined threshold value, the focus controller 13b sets the operation mode to the constant speed mode. On the other hand, when the correction data is smaller than the predetermined threshold value, the focus controller 13b sets the operation mode to the automatic mode.

Figure 6:
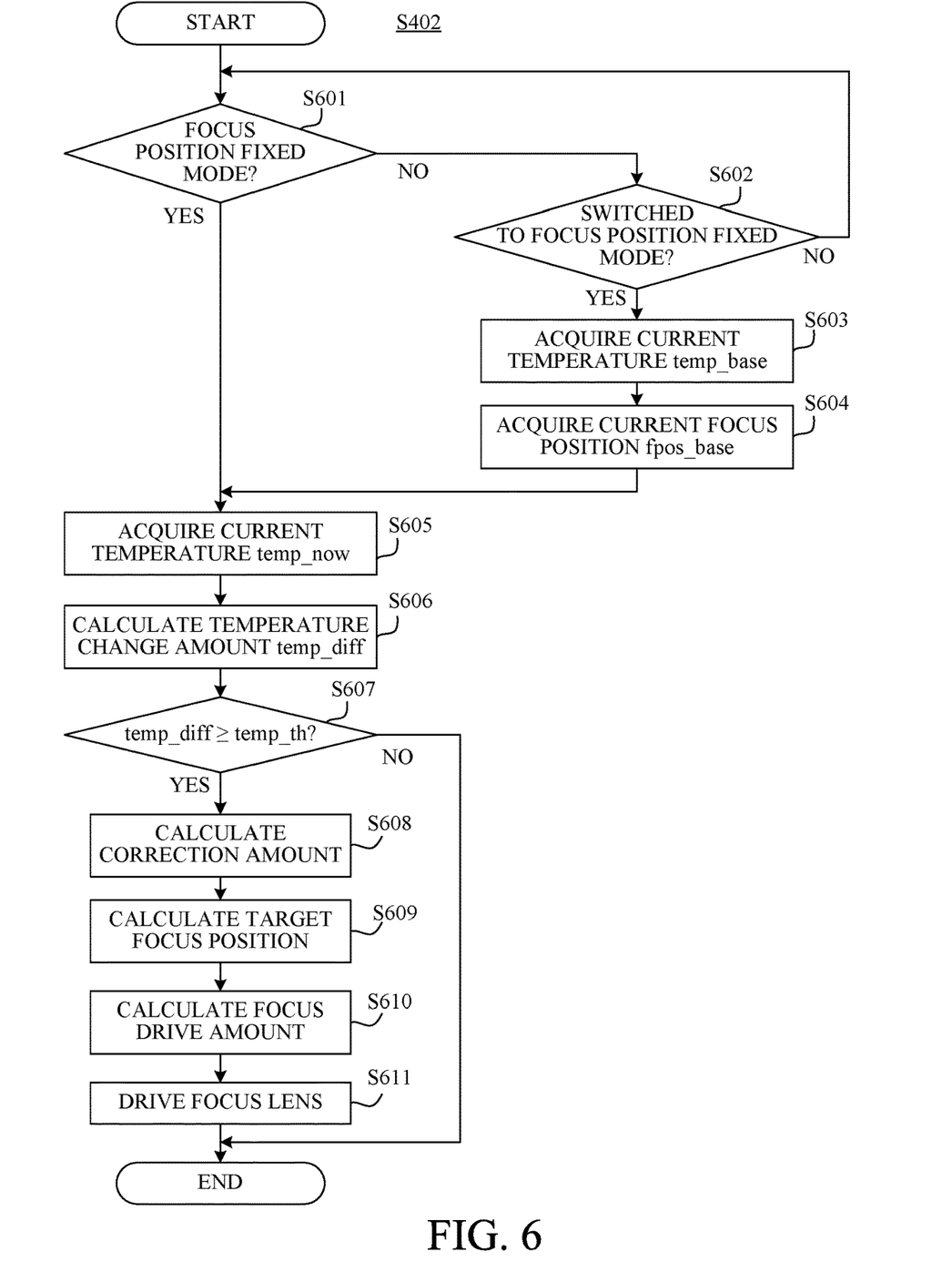
FIG. 6 is a flowchart illustrating a focus control process in the first embodiment.

Next, referring to FIG. 6, step S402 will be described in detail. FIG. 6 is a flowchart illustrating a focus control process of performing the temperature focus correction. First, at step S601, the zoom/focus control unit 13 determines whether the focus position fixed mode is set. When the focus position fixed mode is set, the flow proceeds to step S605. On the other hand, when the focus position fixed mode is not set, the flow proceeds to step S602, and step S601 is repeated until the focus position fixed mode is set. When setting of the focus position fixed mode is instructed at step S602, the zoom/focus control unit 13 acquires a current temperature temp_base from the temperature detection unit 12 at step S603. Subsequently, at step S604, the zoom/focus control unit 13 acquires a current focus position fpos_base from the lens data storing unit 19.

When this control process is performed for the first time after activation of the image capturing apparatus 100 and it is in the focus position fixed mode, the current temperature temp_base is initialized with the temperature at the time of activation of the image capturing apparatus 100. Similarly, the current focus position fpos_base is initialized at the focus position at the time of activation of the image capturing apparatus 100.

At step S605, the zoom/focus control unit 13 acquires a current temperature temp_now from the temperature detection unit 12. Subsequently, at step S606, the zoom/focus control unit 13 calculates a temperature change amount temp_diff according to expression (2) below.

$$\text{temp\_diff} = \text{temp\_now} - \text{temp\_base} \quad (2)$$

Next, at step S607, the zoom/focus control unit 13 determines whether a temperature change amount temp_diff is equal to or larger than a predetermined temperature change amount temp_th. In this embodiment, the predetermined temperature change amount temp_th is set to 5 deg C., but it is not limited thereto. The predetermined temperature change amount temp_th influences the frequency of the temperature focus correction process. For this reason, it is also possible to set the temperature change amount temp_th to be lower as the lens and the zoom position where the temperature focus correction coefficient is large, so that the correction process may be frequently performed. A lens having a large temperature focus correction coefficient is, for example, a lens in which at least one of an expansion ratio or a reduction ratio of a member constituting the lens barrel is larger. An example of such a member is a member using a plastic material. The zoom position where the temperature focus correction coefficient is large is the zoom position on the telephoto side. This is because the change in the focus state is more conspicuous on the telephoto side.

When the temperature change amount temp_diff is less than the predetermined temperature change amount temp_th, this process is ended. On the other hand, when the temperature change amount temp_diff is equal to or larger than the predetermined temperature change amount temp_th, the flow proceeds to step S608.

At step S608, the zoom/focus control unit 13 calculates a correction amount c_amount according to expression (3) below.

$$c\_amount = temp\_diff \times coef \quad (3)$$

Subsequently, at step S609, the zoom/focus control unit 13 calculates a drive target position fpos_target (target focus position) of the focus lens 2 according to expression (4) below.

$$fpos\_target = c\_amount + fpos\_base \quad (4)$$

Subsequently, at step S610, the zoom/focus control unit 13 calculates a focus drive amount d_amount to be given to the focus drive unit 14 according to expression (5) below.

$$d\_amount = fpos\_target - fpos\_now \quad (5)$$

In expression (5), symbol fpos_now is a current focus position acquired from the lens data storing unit 19.

Finally, at step S611, the zoom/focus control unit 13 transmits the focus drive amount d_amount calculated at step S610 together with a drive command to the focus drive unit 14 to drive the focus lens 2 (to perform the focus control).

As described above, in this embodiment, when the temperature change amount temp_diff detected by the temperature detection unit 12 is larger than the predetermined temperature change amount temp_th, the focus controller 13b performs the focus control based on the temperature change amount temp_diff and the correction coefficient coef. On the other hand, when the temperature change amount temp_diff is smaller than the predetermined temperature change amount temp_th, the focus controller 13b does not perform the focus control based on the temperature change amount temp_diff and the correction coefficient coef.

Figure 7:
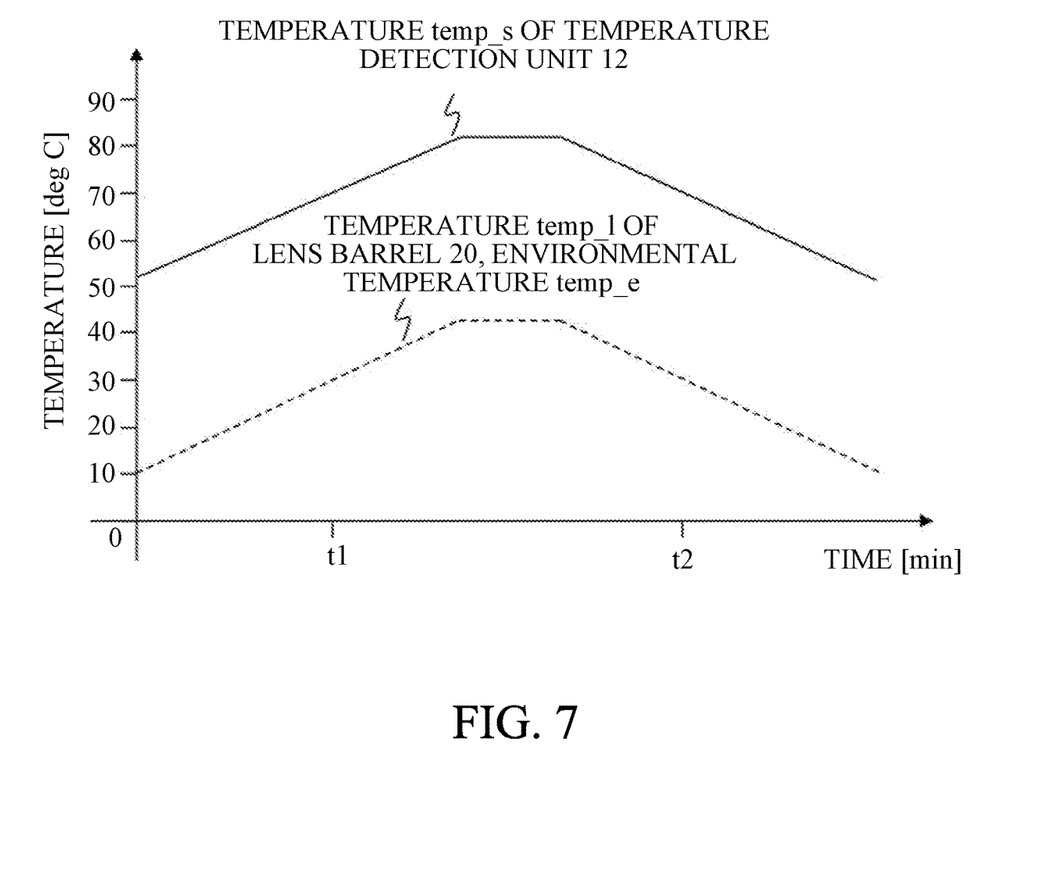
FIG. 7 is a graph illustrating a temperature when the operation mode of the cooling fan is fixed to a low speed mode in each embodiment.

FIG. 7 is a graph illustrating the temperature when the operation mode of the cooling fan 17 is fixed to the low speed mode. According to this embodiment, the rotation speed of the cooling fan is fixed in lenses or zoom positions with a large defocus due to a temperature change. As a result, as illustrated in FIG. 7, the correlation between the temperature temp_s acquired from the temperature detection unit 12 and the temperature temp_1 of the lens barrel 20 increases, and therefore the temperature focus correction can be performed more appropriately. On the other hand, in other lenses or zoom positions, the operation mode of the cooling fan 17 is set to the automatic mode, and therefore fan control superior in terms of quietness and the like is performed.

In this embodiment, while the operation mode of the cooling fan 17 is always fixed to the constant speed mode (low speed mode) according to the lens, depending on the load on the processor 23, such as when an amount of calculation is large, it is conceivable that the calorific value temporarily becomes large. In such a case, the mode may be transited to a mode in which the rotation speed of the cooling fan 17 is temporarily set to a higher speed, and the cooling of the processor 23 may be prioritized. It is preferred that the temperature focus correction process is temporarily stopped during this period and it is restarted after the cooling of the processor 23 is completed.

Further, while this embodiment describes an example in which the correction is performed by a fixed amount of the focus drive based on the temperature focus correction coefficient, the focus position may be corrected by performing a typical AF control instead of steps S608 to S611. In this way, even when there is a variation in defocus amount due to the temperature change, it is possible to perform satisfactory correction. Further, in this embodiment, the temperature focus correction coefficient may be changed according to an aperture value (F number) even for the same lens. In that case, as the F number is lower, the focus deviation becomes more noticeable, and accordingly it is preferred that the correction coefficient is increased.

Second Embodiment

Next, a second embodiment of the present invention will be described. The first embodiment describes an example in which the temperature focus correction process is performed by switching the operation mode of the cooling fan to the constant speed mode according to the lens barrel. However, when the operation mode of the cooling fan is changed, for example, when the lens barrel is exchanged, immediately thereafter, the correlation between the temperature obtained from the temperature sensor and the environmental temperature decreases. As a result, an inappropriate temperature focus correction process is performed, which may result in an adverse effect.

Therefore, in this embodiment, a method of performing a more suitable temperature focus correction process in a lens interchangeable image capturing apparatus by performing a process according to whether the operation mode of the cooling fan is changed will be described. In this embodiment, the lens barrel before exchange is also referred to as a first lens barrel, and the lens barrel after exchange is also referred to as a second lens barrel. The same reference numerals are given to the same components as those of the first embodiment, and detailed descriptions thereof will be omitted.

Figure 8:
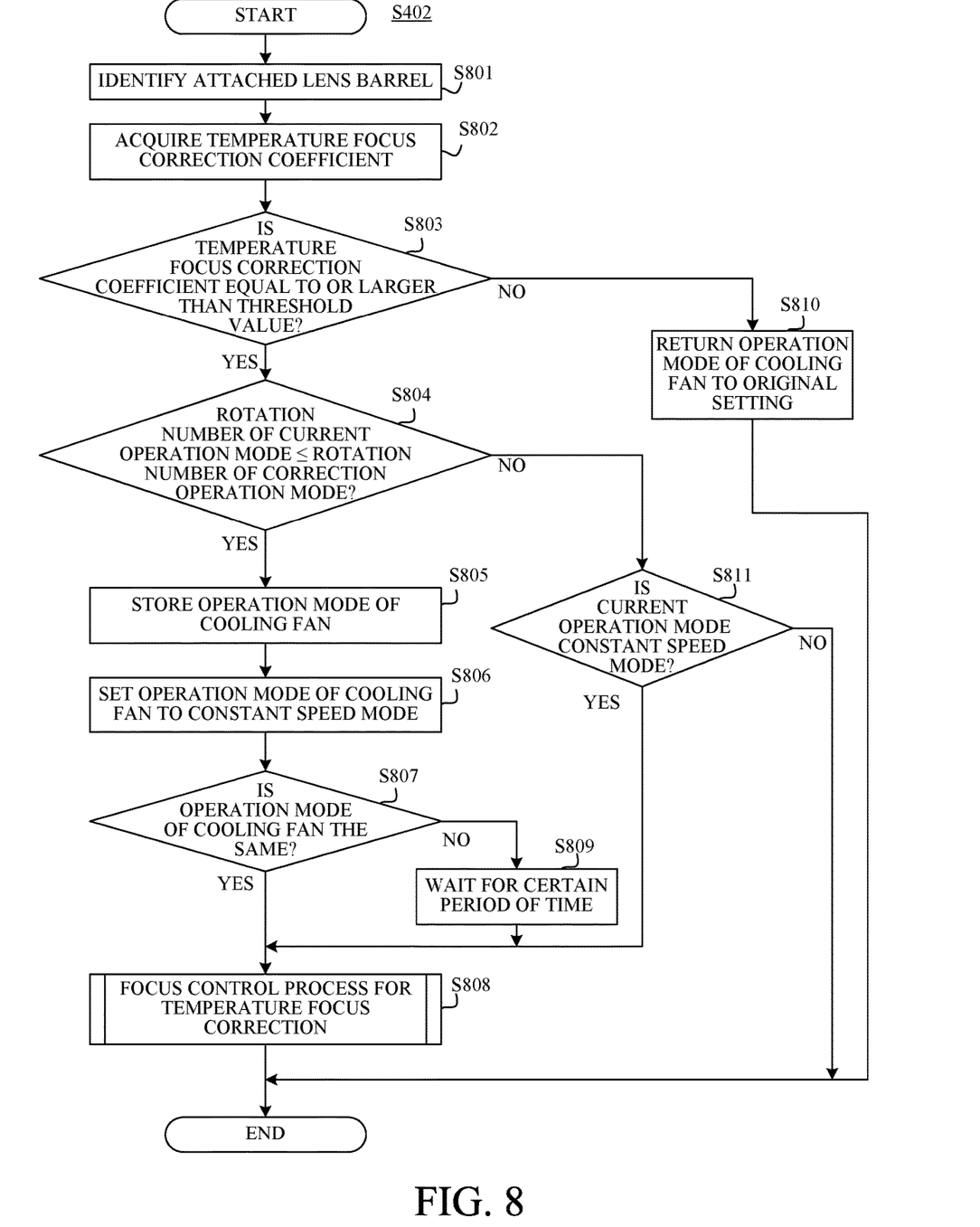
FIG. 8 is a flowchart illustrating a temperature focus correction process in a second embodiment.

Referring to FIG. 8, the temperature focus correction process (focus control method) of this embodiment will be described. FIG. 8 is a flowchart illustrating the temperature focus correction process (focus control method). Each step of FIG. 8 is performed by the zoom/focus control unit 13.

First, at step S801, the zoom/focus control unit 13 identifies the attached lens barrel 20 by the same method as that at step S501. Subsequently, at step S802, the zoom/focus control unit 13 acquires the temperature focus correction coefficient by the same method as that at step S502. Subsequently, at step S803, the zoom/focus control unit 13 determines whether the temperature focus correction coefficient is equal to or larger than the threshold value by the same method as that at step S503. When the temperature focus correction coefficient is equal to or larger than the threshold value, the flow proceeds to step S804. On the other hand, when the temperature focus correction coefficient is less than the threshold value, the flow proceeds to step S810.

At step S804, the zoom/focus control unit 13 determines whether the rotation speed of the current operation mode (rotation mode) of the cooling fan 17 is equal to or less than the rotation number of the operation mode (correction operation mode) set for the temperature focus correction process. The current operation mode is an operation mode set corresponding to the first lens barrel. The operation mode set for the temperature focus correction process is an operation mode set corresponding to the second lens barrel. The magnitude relation of the operation modes is the high speed mode, the medium speed mode, the low speed mode, and the stop mode in order from the side having the larger rotation speed of the cooling fan 17. In the case of the automatic mode, the determination is performed based on the operation mode automatically set at that time. When the current operation mode is the correction operation mode or less, the flow proceeds to step S805. On the other hand, when the current operation mode is larger than the correction operation mode, the flow proceeds to step S811.

At step S805, the zoom/focus control unit 13 stores the current operation mode in a storage unit such as an internal memory. In the case of the automatic mode, the current operation mode is stored as the automatic mode. Subsequently, at step S806, the zoom/focus control unit 13 sets the operation mode of the cooling fan 17 to the constant speed mode by the same method as that at step S504. Subsequently, at step S807, the zoom/focus control unit 13 determines whether the operation mode stored at step S805 is the same as the operation mode set at step S806. When these operation modes are the same, the flow proceeds to step S808. On the other hand, when these operation modes are different, the flow proceeds to step S809.

At step S808, the zoom/focus control unit 13 performs a focus control process for temperature focus correction. The contents of the focus control process are the same as those at step S402.

At step S809, the zoom/focus control unit 13 waits for the process for a certain period of time (wait time is provided). This is to prevent the temperature focus correction process from being performed during the temperature change of the temperature detection unit 12 caused by the change in the operation mode of the cooling fan 17. The wait time is set based on a previously measured value. For example, after stabilizing the temperature of the temperature detection unit 12 so as to be a constant value, the time from changing the operation mode of the cooling fan 17 to returning to the stable state again may be measured in advance as the predetermined time (wait time).

At step S810, the zoom/focus control unit 13 sets the operation mode of the cooling fan 17 to the operation mode stored at step S806 (returns the operation mode to the original setting), and then this process is ended.

At step S811, the zoom/focus control unit 13 determines whether the current operation mode of the cooling fan 17 is the constant speed mode. When the current operation mode is the constant speed mode, the flow proceeds to step S808. On the other hand, when the current operation mode is not the constant speed mode, that is, the current operation mode is the automatic mode, this process is ended.

According to this embodiment, when the operation mode of the cooling fan 17 changes, control is performed not to perform the temperature focus correction process until the temperature detected by the temperature detection unit 12 becomes stable. As a result, it is possible to avoid unnecessary correction due to a temperature change caused by a change in the operation mode of the cooling fan 17, and thus a more suitable temperature focus correction process can be performed.

While each embodiment describes the cooling fan as a temperature changer, the present invention is not limited to this, and it can also be applied to other temperature changers such as a heater and a water cooling apparatus. Further, while each embodiment describes the interchangeable lens as an example, the present invention is not limited to this, and it can also be applied to a lens-integrated image capturing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide a control apparatus, an image capturing apparatus, a control method, and a non-transitory computer-readable storage medium which are capable of satisfactorily correcting a deviation of a focus position caused by a temperature change of an image capturing optical system with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-186519, filed on Sep. 27, 2017, which is hereby incorporated by reference herein in its entirety.

What is claimed is:

1. A control apparatus for an image capturing apparatus, the control apparatus comprising:
a data acquirer configured to acquire correction data for correction of a focus deviation due to a temperature change, the correction data indicating a focus movement amount corresponding to a temperature change amount; and
a focus controller configured to change an operation mode of a temperature changer depending on the correction data,
wherein the temperature changer is a cooling fan, and
wherein the operation mode includes a constant speed mode in which the cooling fan rotates with a constant speed and an automatic mode in which the cooling fan rotates with a variable rotation speed.

2. The control apparatus according to claim 1, wherein:
when the correction data is larger than a predetermined threshold value obtained by dividing a focus drive amount of a depth of field by a width of an operation guarantee temperature of the image capturing apparatus, the focus controller is configured to set the operation mode to the constant speed mode, and
when the correction data is smaller than the predetermined threshold value, the focus controller is configured to set the operation mode to the automatic mode.

3. The control apparatus according to claim 1, further comprising a memory configured to store the correction data,
wherein the data acquirer is configured to acquire the correction data stored in the memory.

4. The control apparatus according to claim 1, wherein the focus controller is configured to perform focus control based on a temperature detected by a temperature detector.

5. The control apparatus according to claim 4, wherein the focus controller is configured to perform the focus control based on a temperature change amount detected by the temperature detector and the correction data.

6. The control apparatus according to claim 5, wherein:
when the temperature change amount detected by the temperature detector is larger than a predetermined temperature change amount, the focus controller is configured to perform the focus control based on the temperature change amount and the correction data, and
when the temperature change amount is smaller than the predetermined temperature change amount, the focus controller is configured not to perform the focus control based on the temperature change amount and the correction data.

7. The control apparatus according to claim 5, wherein the focus controller is configured to perform AF control based on the temperature change amount detected by the temperature detector and the correction data.

8. The control apparatus according to claim 4, wherein when the operation mode of the temperature changer is changed, the focus controller is configured not to perform the focus control based on the correction data during a predetermined period of time.

9. The control apparatus according to claim 1, wherein the correction data are different depending on a type of a lens barrel.

10. The control apparatus according to claim 1, wherein the correction data are different depending on a zoom position of a lens barrel.

11. The control apparatus according to claim 1, wherein the correction data are different depending an F number of a lens barrel.

12. An image capturing apparatus comprising:
a control apparatus for an image capturing apparatus, the control apparatus including:
  a data acquirer configured to acquire correction data for correction of a focus deviation due to a temperature change, the correction data indicating a focus movement amount corresponding to a temperature change amount, and
  a focus controller configured to change an operation mode of a temperature changer depending on the correction data,
  wherein the temperature changer is a cooling fan, and
  wherein the operation mode includes a constant speed mode in which the cooling fan rotates with a constant speed and an automatic mode in which the cooling fan rotates with a variable rotation speed;
an image sensor configured to photoelectrically convert an optical image formed via an image capturing optical system; and
a memory configured to store the correction data,
wherein the data acquirer is configured to acquire the correction data from the memory, and
wherein the temperature changer is configured to change a temperature.

13. A control method for a control apparatus of an image capturing apparatus, the method comprising:
  acquiring correction data for correction of a focus deviation due to a temperature change, the correction data indicating a focus movement amount corresponding to a temperature change amount; and
  changing, by a focus controller of the control apparatus, an operation mode of a temperature changer depending on the correction data,
  wherein the temperature changer is a cooling fan, and
  wherein the operation mode includes a constant speed mode in which the cooling fan rotates with a constant speed and an automatic mode in which the cooling fan rotates with a variable rotation speed.

14. A non-transitory computer-readable storage medium which stores a program causing a computer to execute a process for a control apparatus of an image capturing apparatus, the process comprising:
  acquiring correction data for correction of a focus deviation due to a temperature change, the correction data indicating a focus movement amount corresponding to a temperature change amount; and
  changing, by a focus controller of the control apparatus, an operation mode of a temperature changer depending on the correction data,
  wherein the temperature changer is a cooling fan, and
  wherein the operation mode includes a constant speed mode in which the cooling fan rotates with a constant speed and an automatic mode in which the cooling fan rotates with a variable rotation speed.

* * * * *